(12) United States Patent
Kasten

(10) Patent No.: US 9,141,310 B1
(45) Date of Patent: Sep. 22, 2015

(54) METHODS AND APPARATUSES FOR SHARED STATE INFORMATION AMONG CONCURRENTLY RUNNING PROCESSES OR THREADS

(71) Applicant: Google Inc., Mountain View, CA (US)

(72) Inventor: Glenn Kasten, Mountain View, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/926,790

(22) Filed: Jun. 25, 2013

Related U.S. Application Data

(60) Provisional application No. 61/665,283, filed on Jun. 27, 2012.

(51) Int. Cl.
*G06F 12/00* (2006.01)
*G06F 3/06* (2006.01)
*G06F 5/10* (2006.01)

(52) U.S. Cl.
CPC .............. *G06F 3/0689* (2013.01); *G06F 5/10* (2013.01); *G06F 2205/106* (2013.01); *G06F 2205/108* (2013.01)

(58) Field of Classification Search
None
See application file for complete search history.

(56) References Cited

U.S. PATENT DOCUMENTS

2011/0185144 A1\* 7/2011 Printezis et al. .............. 711/166

\* cited by examiner

*Primary Examiner* — Duc Doan
(74) *Attorney, Agent, or Firm* — McDonnell Boehnen Hulbert & Berghoff LLP

(57) ABSTRACT

In a system where data is shared by a first module writing the information to memory, and a second module then reading the information from the memory, asynchronous and/or unpredictable operation of the two modules may lead to instances of blocking and/or instances of the second module reading invalid data from the memory. Aspects of the present disclosure manage reads and writes to memory such that blocking by either the first module and/or the second module, and/or reads of invalid data by the second module, may be prevented if so desired.

18 Claims, 20 Drawing Sheets

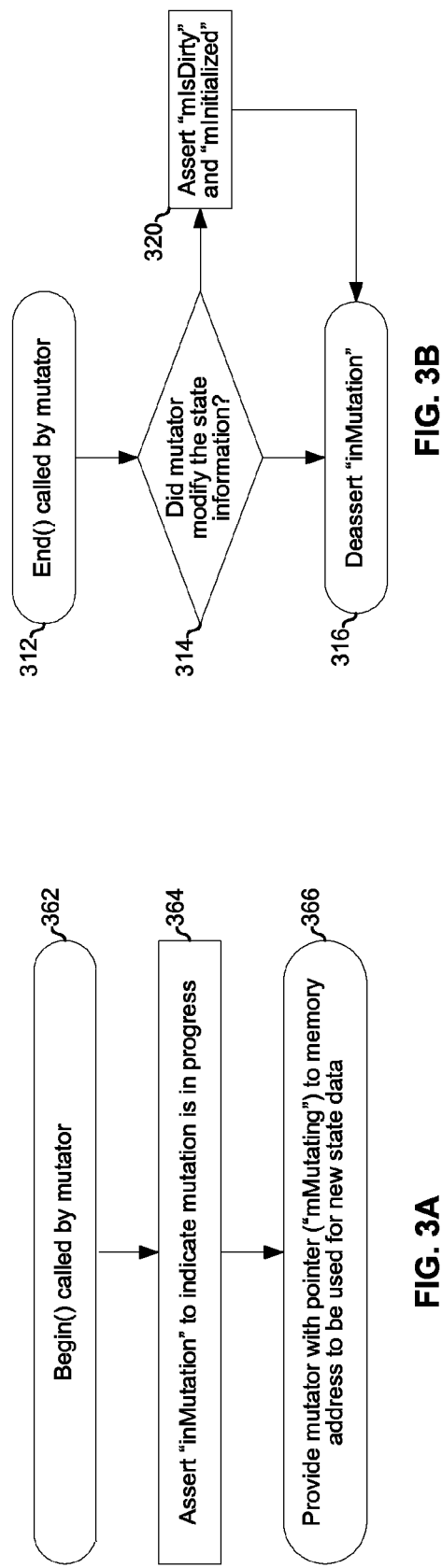

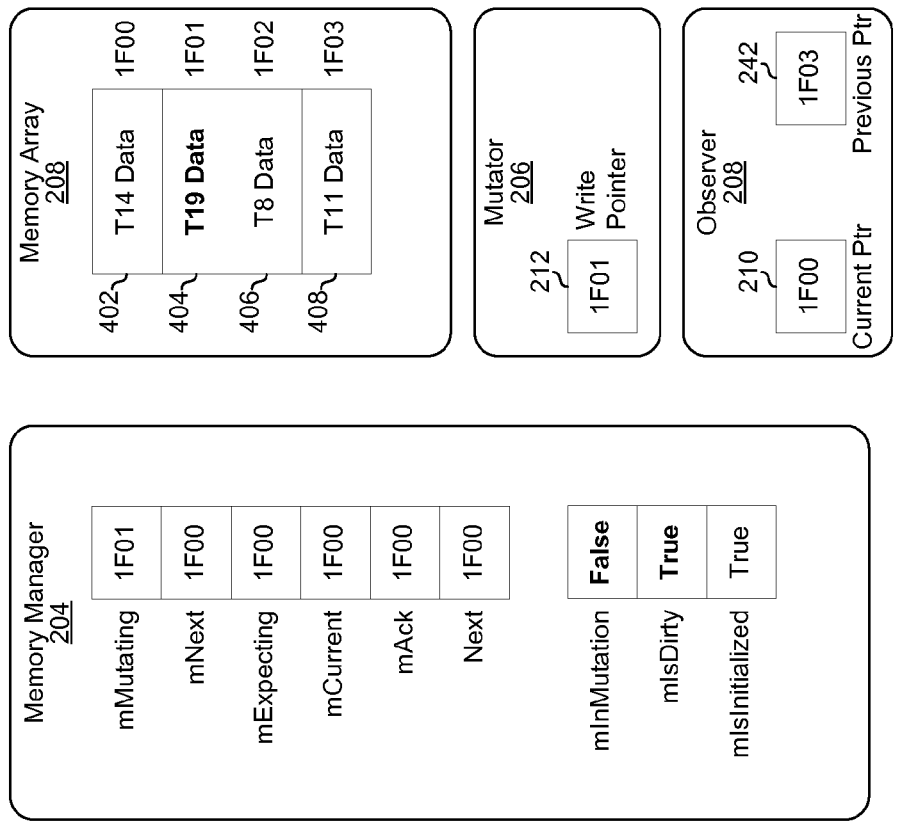

METHODS AND APPARATUSES FOR SHARED STATE INFORMATION AMONG CONCURRENTLY RUNNING PROCESSES OR THREADS

CROSS-REFERENCE TO RELATED APPLICATION

This application claims the benefit of U.S. Provisional Application No. 61/665,283, filed Jun. 27, 2012.

BACKGROUND

Conventional methods and systems for sharing state information can be inefficient in terms of resource usage or in predictability of performance. Further limitations and disadvantages of conventional and traditional approaches will become apparent to one of skill in the art, through comparison of such approaches with some aspects of the present method and apparatus set forth in the remainder of this disclosure with reference to the figures.

SUMMARY

In one embodiment, the present disclosure provides a system including a mutator, an observer, an N-element memory array, a first pointer used by the mutator for writing to the N-element memory array, a second pointer used by the first observer for reading from the N-element memory array, and a third pointer. In response to a first function being called by the mutator, the system may be configured to provide the first pointer to the mutator. In response to a second function being called by the mutator, the system may be configured to set the third pointer equal to the first pointer and then circularly advances the first pointer. In response to a third function being called by the mutator, the system may be configured to set the second pointer equal to the third pointer, and then provides the second pointer to the observer.

In another embodiment, the present disclosure provides a method performed by a system. The system may include a mutator, an observer, an N-element memory array, a first pointer used by the mutator for writing to the N-element memory array, a second pointer used by the observer reading the N-element memory array, and a third pointer. The method may include providing the first pointer to the mutator in response to a first function being called by the mutator. The method may also include setting the third pointer equal to the first pointer and then circularly advancing the first pointer, in response to a second function being called by the mutator. The method may also include setting the second pointer equal to the third pointer, and then providing the second pointer to the observer, in response to a third function being called by the observer.

In yet another embodiment, the present disclosure provides a computer readable storage device encoded with a computer program, the program comprising instructions that, if executed by one or more computers, cause the one or more computers to perform operations. The operations may include providing a first pointer to a mutator in response to a first function being called by the mutator. The operations may also include setting a third pointer equal to the first pointer and then circularly advancing the first pointer, in response to a second function being called by the mutator. The operations may also include setting a second pointer equal to the third pointer, and then providing the second pointer to the observer, in response to a third function being called by the observer.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3A is a flowchart depicting example functions of a Begin( ) function, which may be part of an API available to a module which shares memory with another concurrently-running module.

FIG. 3B is a flowchart depicting example functions of an End( ) function, which may be part of an API available to a module which shares memory with another concurrently-running module.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
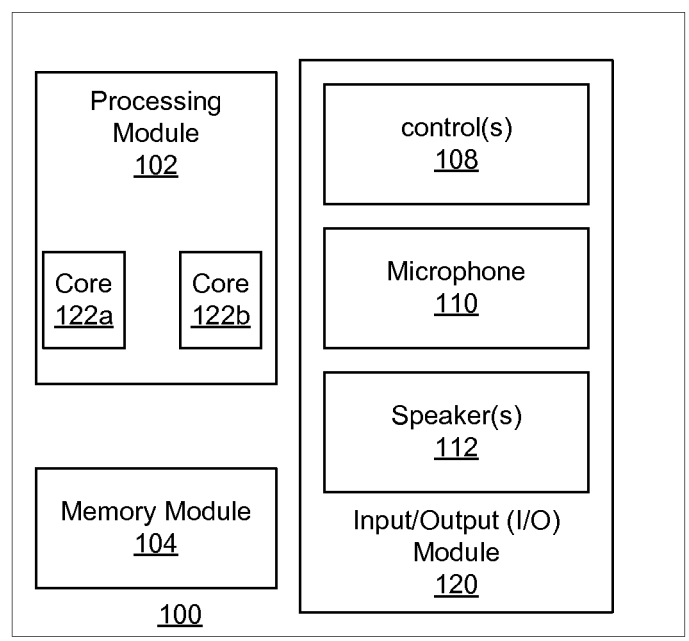
FIG. 1 depicts an example electronic device configured to enable sharing of state information in accordance with an implementation of the present disclosure.

FIG. 1 depicts an example electronic device 100 configured to enable sharing of state information in accordance with an implementation of the present disclosure. The example device 100 comprises a processing module 102, a memory module 104, and an input/output (I/O) module 120.

The processing module 102 may be operable to execute lines of code (e.g., code corresponding to an operating system and/or one or more applications programs) to effect operation of the electronic device 100. The processing module 102 may be operable to run multiple modules concurrently. The processing module 102 may be operable to manage accesses to memory 104 such that: memory usage is kept low (i.e., copying of state information is avoided when possible); and concurrently-running modules can share information with one another via the memory 104 without blocking each other (i.e., without one preventing the other from accessing needed information in the memory 104) for an unpredictable and/or intolerable amount of time.

In an example implementation, the processing module 102 comprises one or more processing cores 122a, 122b. In such an implementation, a first of a pair of concurrently-running modules (e.g., threads or processes) may run on a first processing core 122a and a second of the pair of concurrently-running modules may run on a second processing core 122b. In another example implementation, the processing module 102 may be, for example, a VHDL "entity" compiled, synthesized, and programmed into an FPGA or ASIC, along with a pair of concurrently-running modules, each of which may also be, for example, a VHDL "entity" compiled, synthesized, and programmed into the FPGA or ASIC.

The memory module 104 may comprise volatile and/or non-volatile memory. The memory module 104 may comprise cache memory, main memory, and/or configuration registers. The memory module 104 may store, for example, general data, configuration parameters, program code, and/or run-time data generated by the processing module 102 while executing program code. The memory module 104 may be distributed among various components of the device 100.

The input/output (I/O) module 120 may enable a user to interact with the electronic device 100. In this regard, the I/O module 120 may support various types of inputs and/or outputs, including video, audio, and/or text. I/O devices and/or components, external or internal, may be utilized for inputting and/or outputting data during operations of the I/O module 120. The I/O module 120 may comprise, for example, control(s) 108, a microphone 110, and speaker(s) 112.

The controls 108 may comprise, for example, a touchscreen and/or one or more "hard" buttons that enable a user to interact with the device 100. The microphone 110 may be operable to convert acoustic waves into digital electronic signals which may then be stored and/or processed as one or more audio tracks. The speaker(s) 112 may be operable to convert electronic signals representing one or more audio tracks to corresponding acoustic waves.

In operation, a first module ("observer") may need data from a second module ("mutator") that runs concurrently with the first module. A mutator, when invoked, is a function that changes the value of an attribute of a structured type. Mutator functions are invoked for each attribute of the instance to assign values to each attribute. There are two parameters to any mutator function. The first parameter is implicit and is the instance of the type. The second parameter is explicit and is the value assigned to the attribute. The value returned by a mutator function is a new instance of the type with the modified attribute value. An observer is the opposite of a mutator; its job is to retrieve the value of an attribute of a structured type.

Data may be provided from the mutator to the observer by the mutator writing the information to the memory 104, and the observer then reading the information from the memory 104. During operation, however, the mutator and observer may each cycle between an idle state and an active state, and do so with different periods (e.g., the mutator may cycle with an average period T1 and the observer may cycle with an average period of T2). Moreover, the periods may be variable and may be asynchronous with respect to each other such that the observer may be unable to predict when the mutator will be writing to memory and the mutator may be unable to predict when the observer will be reading from memory. Moreover, even if one could predict when the other would be accessing memory, waiting for such access could lead to error or undesirable effects. Consequently, absent aspects of this disclosure, instances of blocking and/or instances of the observer reading invalid data from the memory 104 would likely occur. Aspects of this disclosure, however, manage reads and writes to memory 104 such that blocking by either the observer and/or the mutator, and/or reads of invalid data by the observer, may be prevented if so desired.

Figure 2:
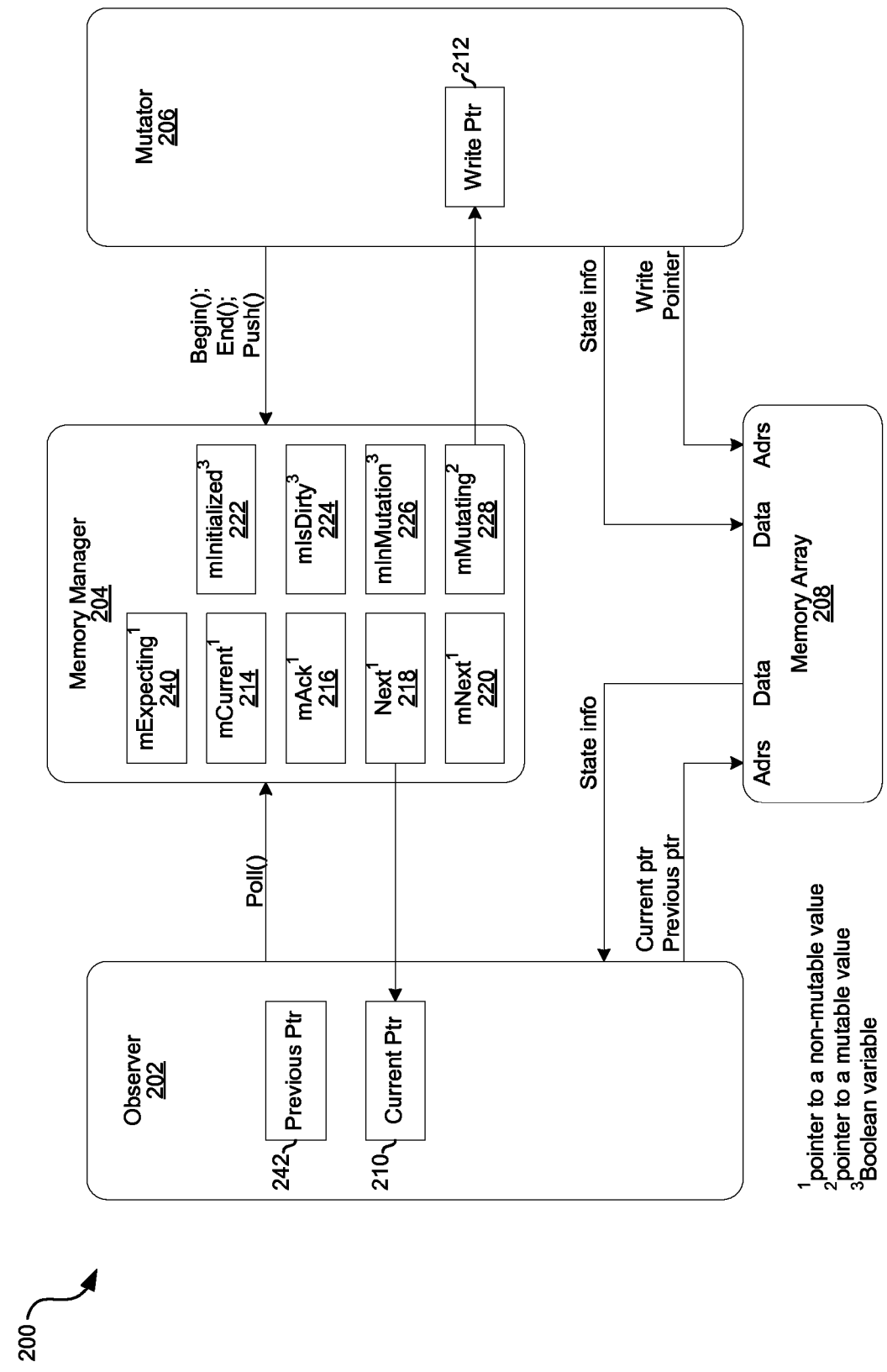
FIG. 2 depicts an example system in which state information is shared between concurrently-running processes or threads.

FIG. 2 depicts an example system in which state information is shared between concurrently-running processes or threads. The example subsystem 200 comprises an observer 202, a memory manager 204, a mutator 206, and a memory array 208.

The memory array 208 may comprise N (an integer number) elements corresponding to N locations in memory 104. Each element of the array 208 may be operable to store one or more bits of data. In an example implementation, the observer 202 and mutator 206 are mixers and data stored in the memory array 208 comprises information about audio tracks being processed by the device in which the system 200 resides (e.g., device 100) and/or about a configuration of one or more modules (e.g., the I/O module 120) that process audio.

The observer 202 may be operable to maintain a previous pointer 242 and a current pointer 210. The mutator 206 may be operable to maintain a write pointer 212. The memory manager 204 may be operable to maintain pointers mExpecting 240, mCurrent 214, mAck 216, Next 218, mNext 220, and mMutating 228. Each of the pointers may point to elements of the memory array 208 and may be operable to store a memory address. The memory manager 204 may be operable to maintain variables mInitialized 222, mIsDirty 224, and mInMutation 226. Each of the variables may correspond to locations in memory 104 and be operable to store Boolean values.

In operation, the observer 202 may need state information from the mutator 206. This state information may be provided from the mutator 206 to the observer 202 by the mutator 206 writing the information to the memory array 208, and the observer 202 subsequently reading the information from the memory array 208. These reads and writes may be managed by the memory manager 204. More specifically, the mutator 206 and the observer 202 may each interact with the memory manager 204 via a respective application programming interface (API) in order to obtain pointers to be utilized for reading from and writing to the memory array 208. Use of the API may enable the observer 202 to directly use state information in the memory array 208 without having to make a copy of the state information. The API via which the mutator 206 interfaces with the memory manager 204 may comprise a Begin( ) function, an End( ) function, and a Push( ) function. The API via which the observer 202 interfaces with the memory manager 204 may comprise a Poll( ) function. Example steps of these functions are described below with reference to FIGS. 3A-3D. An example sequence of function calls is described below with respect to FIGS. 4A-4N.

FIG. 3A is a flowchart depicting example functions of a Begin( ) function, which may be part of an API available to a module which shares memory with another concurrently-running module. The functions begin with function 362 when the Begin( ) function is called by the mutator 206. In function 364, mInMutation 226 is asserted to indicate that a mutation (a modification of contents of an element of the memory array 208) is in progress. In function 366, the mutator 206 is provided by memory manager 204 with the pointer mMutating 228. Memory manager 204 links the write pointer 212 with pointer mMutating 228.

Example source code for the Begin( ) function is disclosed in Appendices A and B.

FIG. 3B is a flowchart depicting example functions of an End( ) function, which may be part of an API available to a module which shares memory with another concurrently-running module. The functions begin with function 312 in which the End( ) function is called by the mutator 206. In function 314, it may be determined whether mutator 206 modified the state information stored in the element of the memory array 208 pointed to by mMutating 228. If so, then in function 320 the variables mIsDirty 224 and mInitialized are asserted and the functions proceed to function 316. If not, function 320 is skipped and the steps proceed to function 316. In function 316, the variable mInMutation 226 is deasserted.

Example source code for the End( ) function is disclosed in Appendices A and B.

Figure 3C:
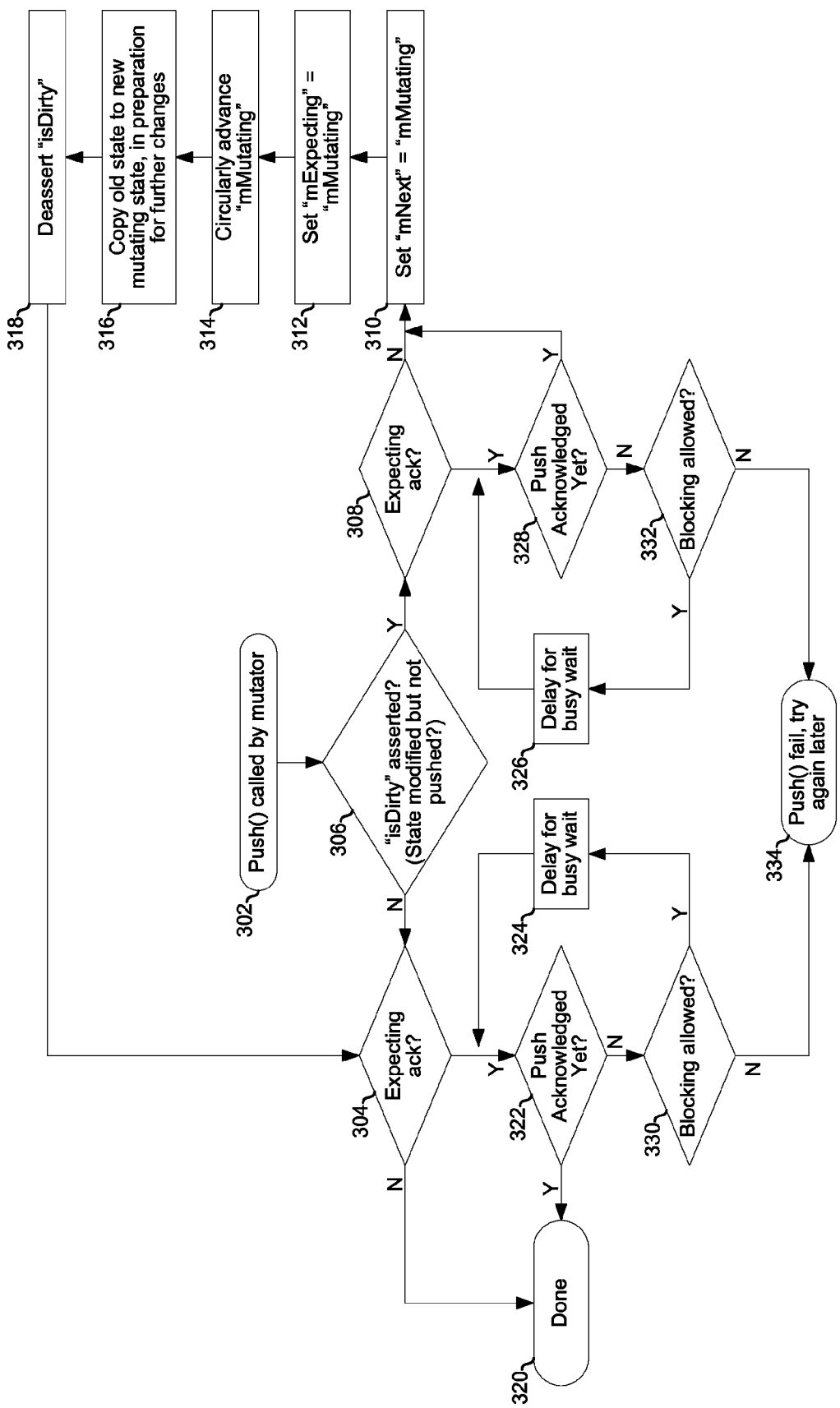
FIG. 3C is a flowchart depicting example functions of a Push( ) function, which may be part of an API available to a module which shares memory with another concurrently-running module.

FIG. 3C is a flowchart depicting example functions of a Push( ) function, which may be part of an API available to a module which shares memory with another concurrently-running module. The functions begin with function 302 in which the Push( ) function is called by the mutator 206. After function 302, the functions proceed to function 306.

In function 306, it is determined whether variable mIsDirty 224 is asserted. In other words, it is determined whether state information in the memory array 208 has been modified since the last successful Push( ). If yes, then the functions proceed to function 308.

In function 308, it is determined whether a Push( ) acknowledgement is expected. If not, then the functions proceed to function 310.

In function 310, the pointer mNext 220 is set equal to the pointer mMutating 228 (i.e., mNext 220 is set to point to the same memory location as mMutating 228). In an example implementation, this may be achieved through a linearizable releasing store of mNext 220 such that it appears to the mutator 206 and the observer 202 as if it occurred instantaneously. In this manner, the observer 202 may be prevented from reading an invalid value of mMutating 228 while mMutating 228 is in the process of changing from one value to another.

In function 312, the pointer mExpecting 240 is set equal to the pointer mMutating 228. After function 312, the functions proceed to function 314.

In function 314, the pointer mMutating 228 is circularly advanced (i.e., modified to point to the next element of the memory array 208, and wrapped around to point to the first element of memory array 208 if it was pointing to last element of memory array 208). For example, the memory array 208 may have four elements and the element pointed to by mMutating 228 before and after the circular advancement may be as shown in table 1 below.

TABLE 1

| Circular advancement of mMutating | |
|---|---|
| Pointed to before circular advancement | Pointed to after circular advancement |
| Element [0] | Element [1] |
| Element [1] | Element [2] |
| Element [2] | Element [3] |
| Element [3] | Element [0] |

In function 316, the memory manager 204 copies state information from the element of memory array 208 pointed to by mMutating 228 before mMutating 228 was circularly advanced to the mutator 206. The memory manager 204 then copies state information from the element of memory array 208 pointed to by mMutating 228 after mMutating 228 was circularly advanced to the mutator 206, and the memory manager 204 merges the previous copied state information with the current copied state information. As a result, the mutator 206 only needs to write changed state information to the memory array 208 and does not have to rewrite unchanged state information.

In function 318, the memory manager 204 de-asserts the variable mIsDirty 224. After function 318, the functions proceed to function 304.

In function 304, it is determined whether a Push( ) acknowledgement is expected. If not, then the functions proceed to function 320 and the Push( ) has successfully completed.

Example source code for the Begin( ) function is disclosed in Appendices A and B.

Returning to function 304, if a Push( ) acknowledgment is expected, then in function 322 it is determined whether the push has been acknowledged yet. In an example implementation, this may involve a linearizable acquiring load of mAck 216 and then a comparison of mAck 216 and mExpecting 240. If the Push( ) has been acknowledged, then the steps proceed to step 320 and the Push( ) has successfully completed.

Returning to function 322, if the expected Push( ) acknowledgement has not yet been received, then in function 330 it is determined whether blocking is allowed. If no blocking is allowed, then the functions proceed to function 334 and the Push( ) exits without successful completion. Consequently, the current state pointed to by mMutating 228 remains dirty, mIsDirty remains asserted, and the Push( ) may be attempted again later as needed.

Returning to function 330, if blocking is allowed, then the functions proceed to function 324. In function 324, advancement of the functions pauses for determined amount of time (i.e., a busy wait operation is performed) and then the functions return to previously-described step 322.

Returning to function 308, if a Push( ) acknowledgment is expected, then the functions proceed to function 328. In function 328, it is determined whether the expected Push( ) acknowledgement has been received yet. If so, then the functions proceed to the previously-described function 310.

Returning to function 328, if the expected Push( ) acknowledgement has not yet been received, then in function 332 it is determined whether blocking is allowed. If no blocking is allowed, then the functions proceed to function 334 and the Push( ) exits without successful completion.

Returning to function 332, if blocking is allowed, then the functions proceed to function 326. In function 326, advancement of the functions pauses for a determined amount of time (i.e., a busy wait operation is performed) and then the functions return to previously-described function 328.

Returning to function 306, if mIsDirty 224 is not asserted, then the functions proceed to previously-described function 304.

In the implementation described in FIG. 3C, the system 200 is prevented from performing a Push( ) when a previous Push( ) has not yet been acknowledged. In other implementations, a Push( ) may be performed without waiting for a previous Push( ) to be acknowledged. In such an implementation, the number of consecutive Push( ) calls without an acknowledgement may be limited, for example, by the number of consecutive changes to the state information that the observer 202 can miss without introducing unacceptable errors.

Figure 3D:
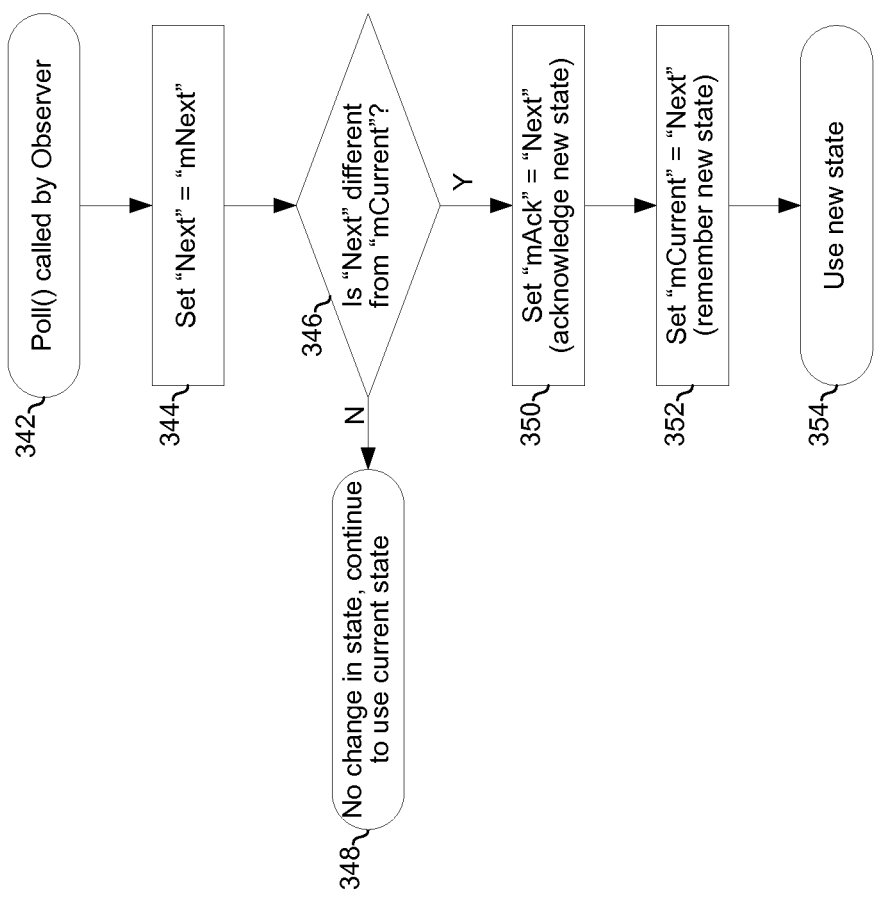
FIG. 3D is a flowchart depicting example functions of a Poll( ) function which may be part of an API available to a module which shares memory with another concurrently-running module.

FIG. 3D is a flowchart depicting example functions of a Poll( ) function which may be part of an API available to a module which shares memory with another concurrently-running module. The functions begin with function 342 in which Poll( ) is called by the observer 202. After function 342, the functions proceed to function 344.

In function 344, the pointer Next 218 is set equal to the pointer mNext 220. In an example implementation, this may be achieved through a linearizable acquiring load of mNext 220 such that it appears to the mutator 206 and the observer 202 as if it occurred instantaneously. In this manner, the observer 202 may be prevented from reading an invalid value of mNext 220 while mNext 220 is in the process of changing from one value to another. After function 344, the steps proceed to function 346. In function 346, it is determined whether the pointer Next 218 is different (i.e., points to a different memory location) than the pointer mCurrent 214. If not, then, in function 348, it is determined that there has been no change in state such that the observer 202 can continue to use the current state.

Returning to function 346, if the pointer Next 218 is different (i.e., points to a different memory location) than the pointer mCurrent 214 then a Push( ) has not been acknowledged. Accordingly, in function 350, the Push( ) may be acknowledged by setting the pointer mAck 216 equal to the pointer Next 218. In an example implementation, this may be achieved through a linearizable releasing store of mAck 216 such that it appears to the mutator 206 and the observer 202 as if it occurred instantaneously. After function 350, the steps proceed to function 352.

In function 352 the pointer mCurrent 214 may be set equal to the pointer Next 218. In functions 350 and 352, Next 218 may be used rather than mNext 220 because mNext 220 may change value between function 344 and 350 and/or between functions 350 and 352. After function 352, the functions proceed to function 354.

In function 354, the Poll( ) function is complete and the observer 202 may utilize the new state information.

Example source code for the Poll( ) function is disclosed in Appendices A and B.

Figure 4A:
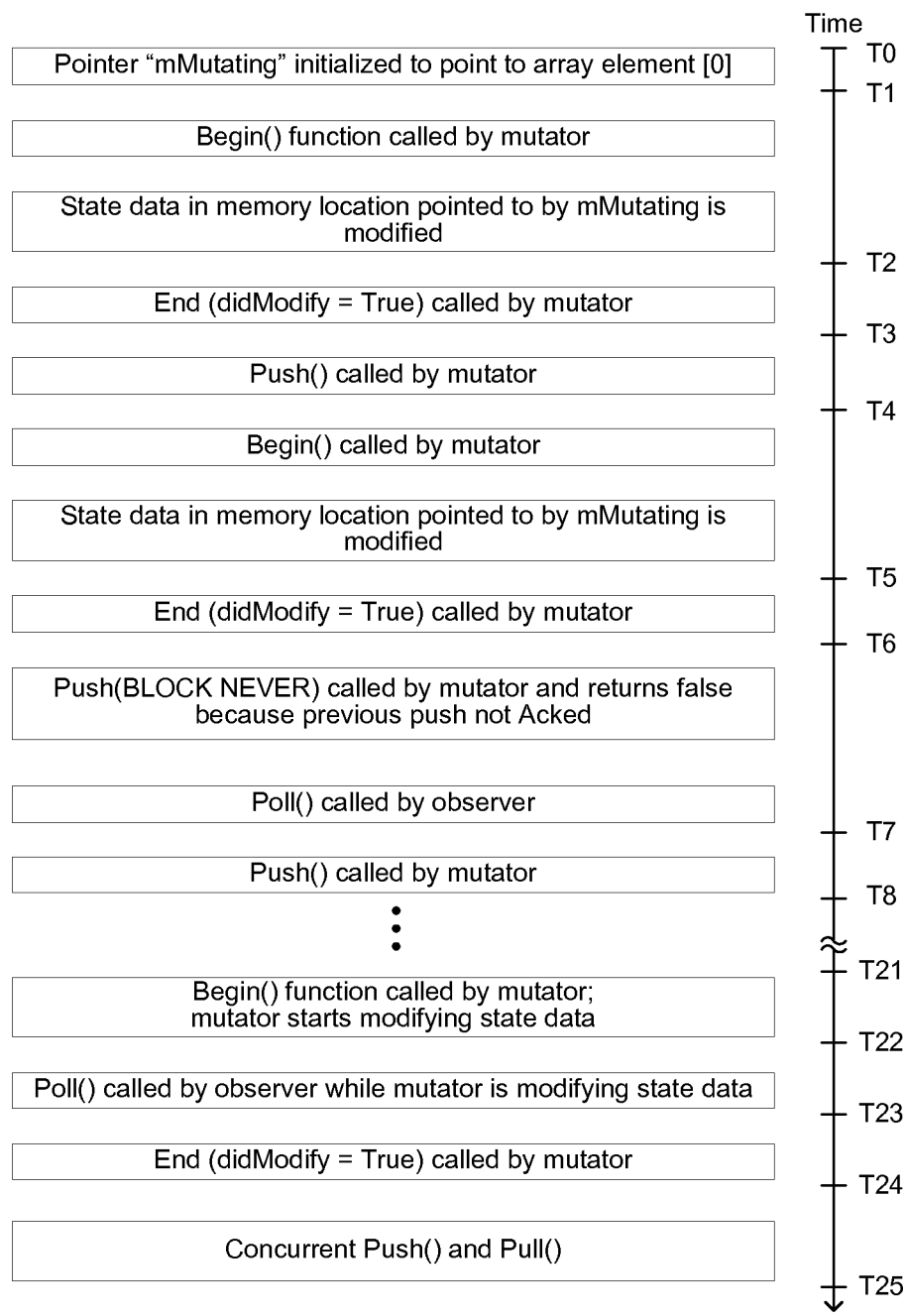
FIGS. 4A-4N depict an example sequence of events in a system operable to share state information in accordance with an implementation of this disclosure.
Figure 4B:
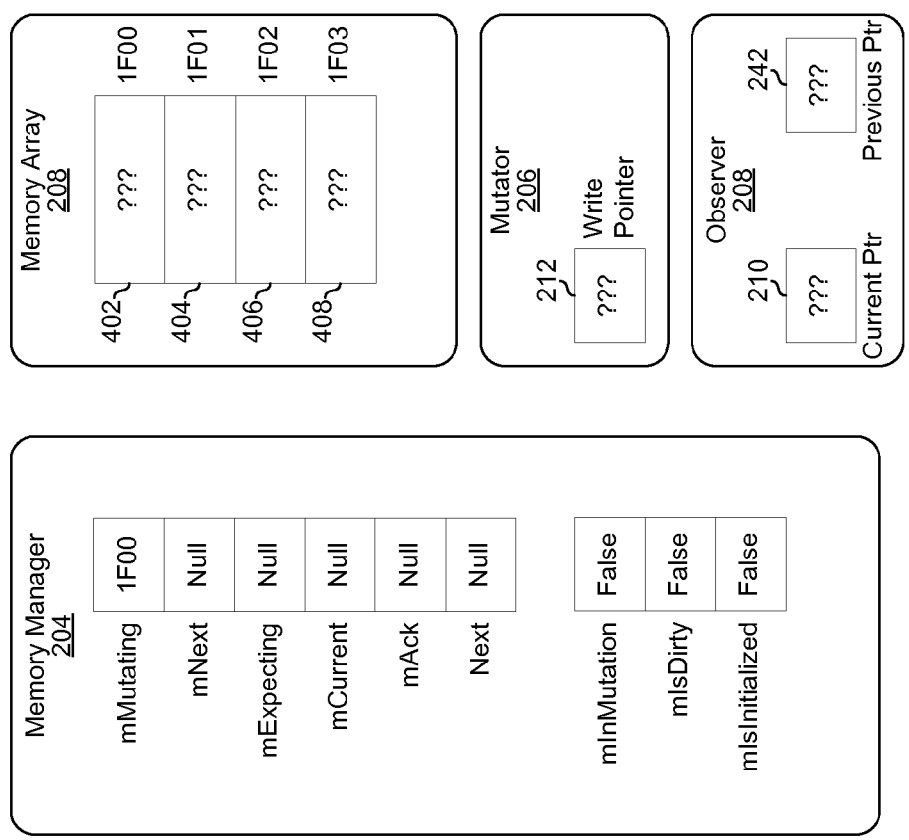
Figure 4C:
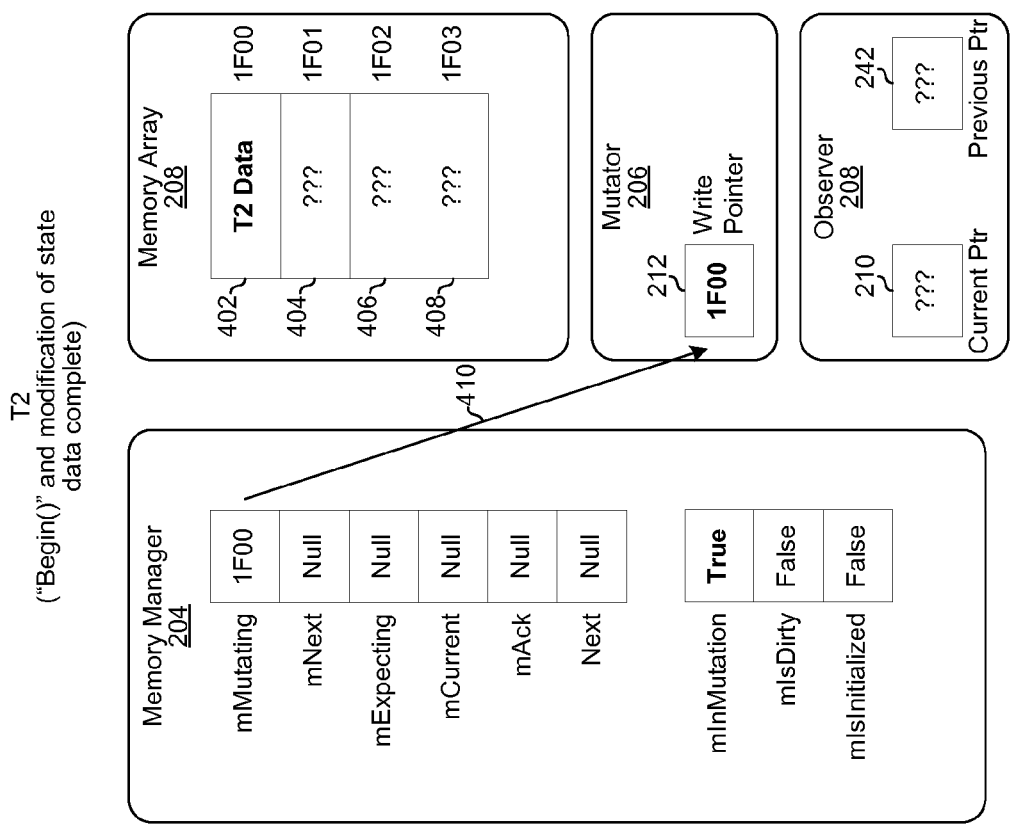
Figure 4D:
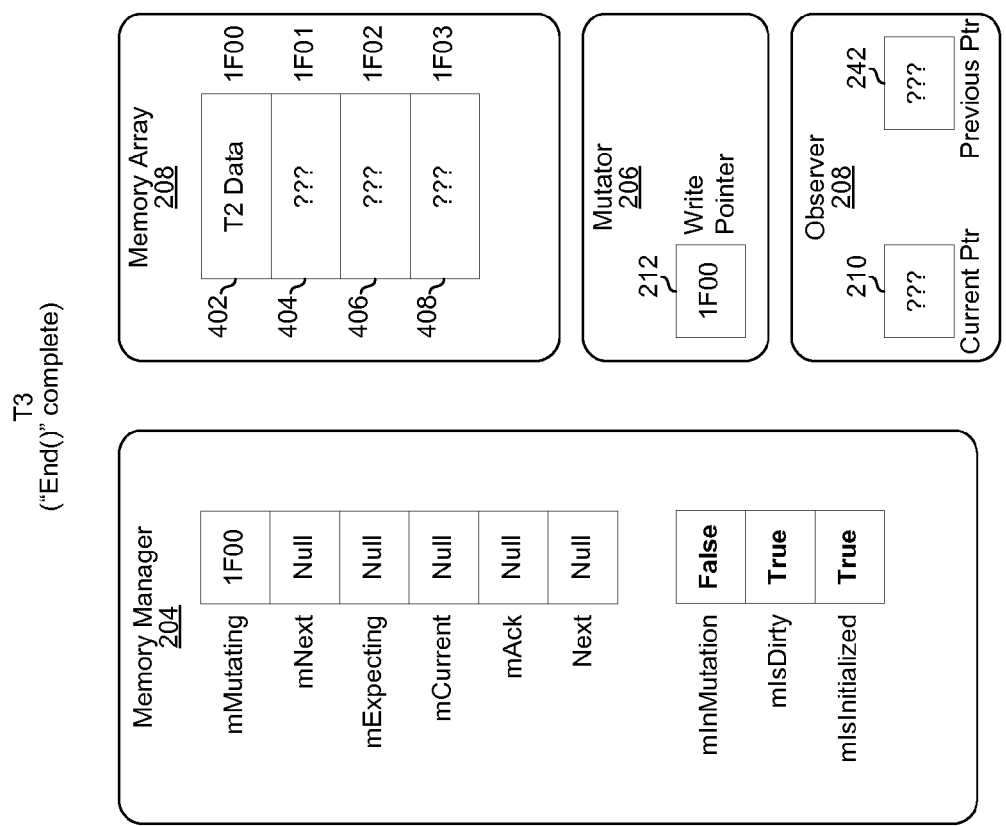
Figure 4E:
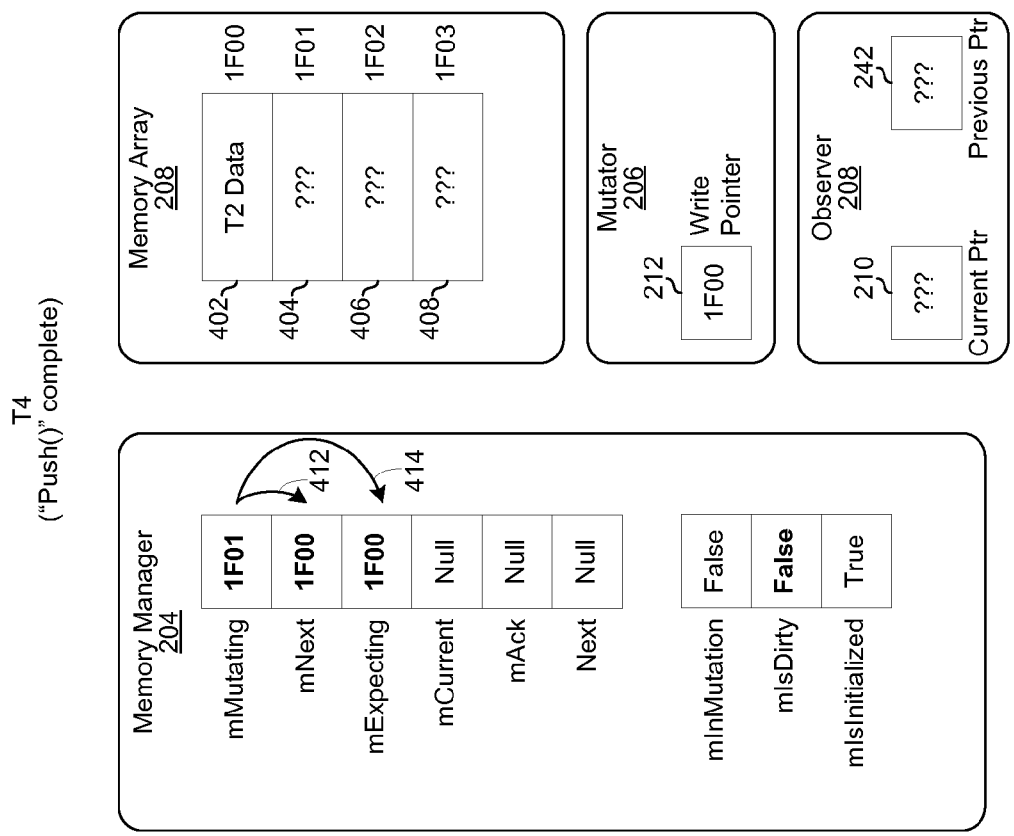
Figure 4F:
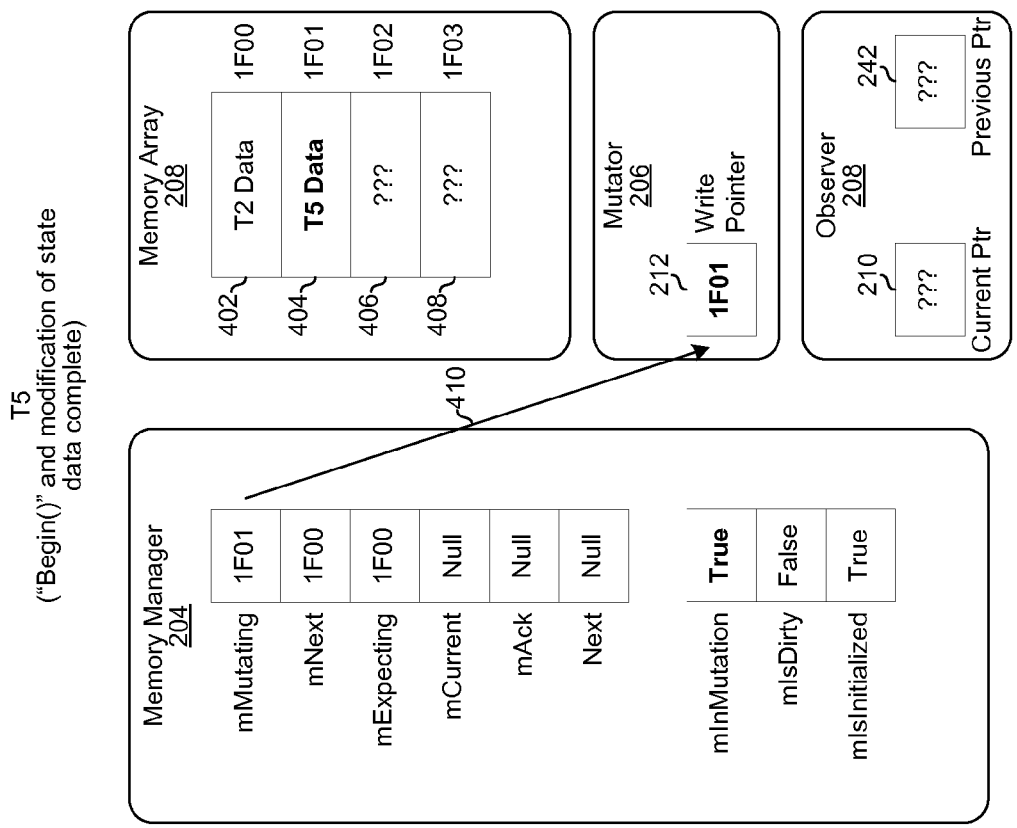
Figure 4G:
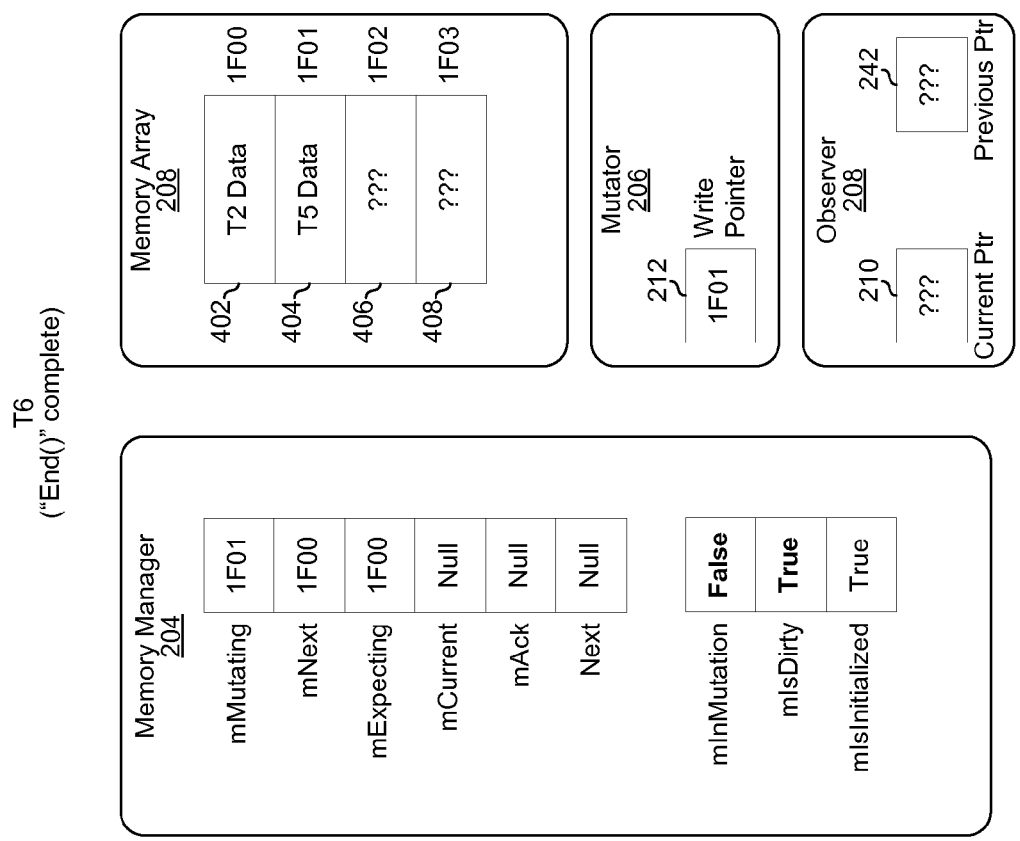
Figure 4H:
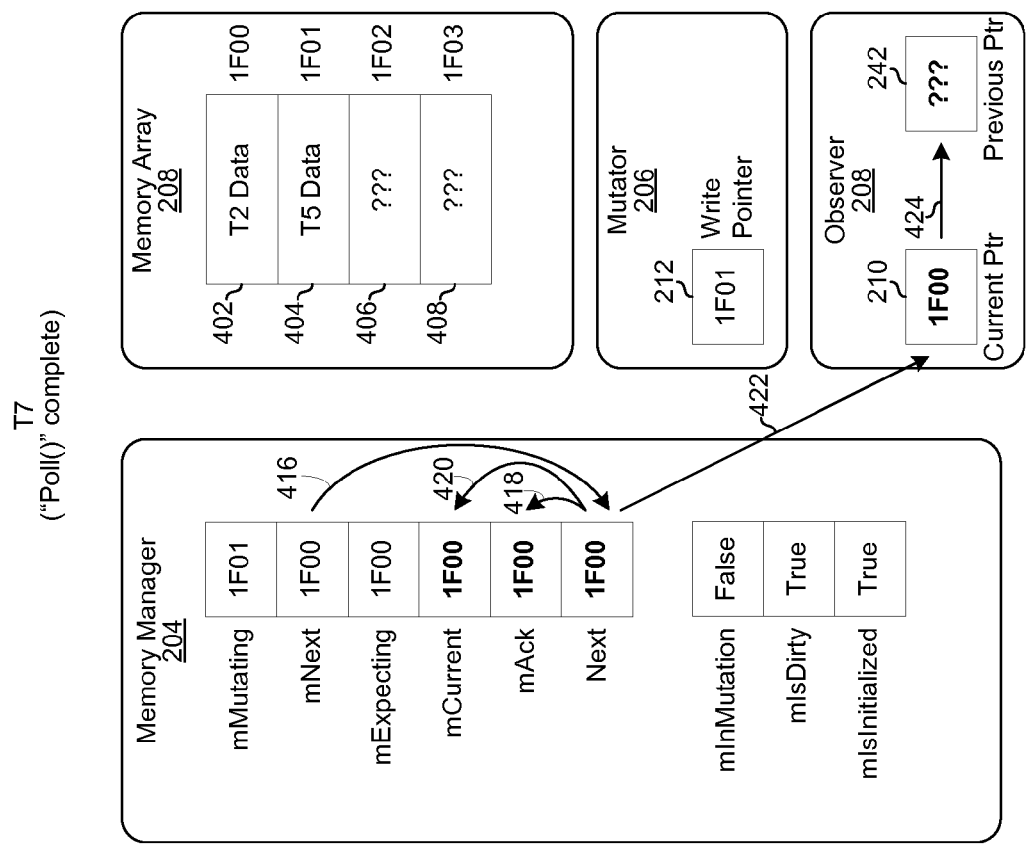
Figure 4I:
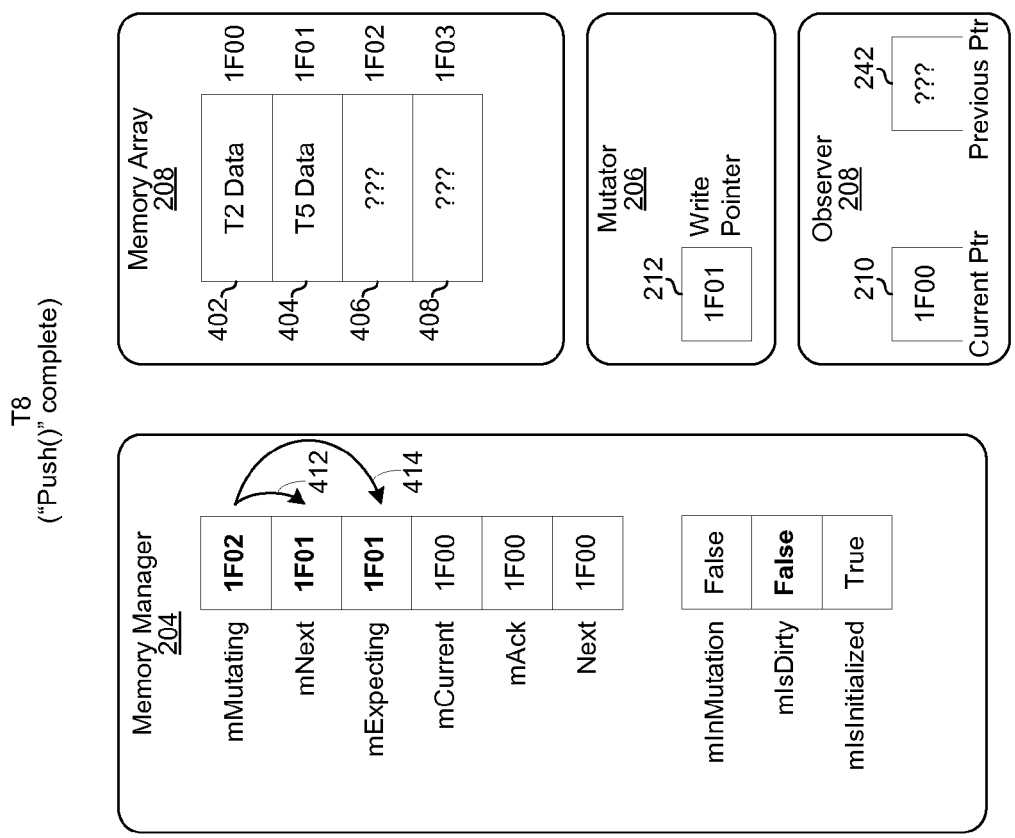
Figure 4J:
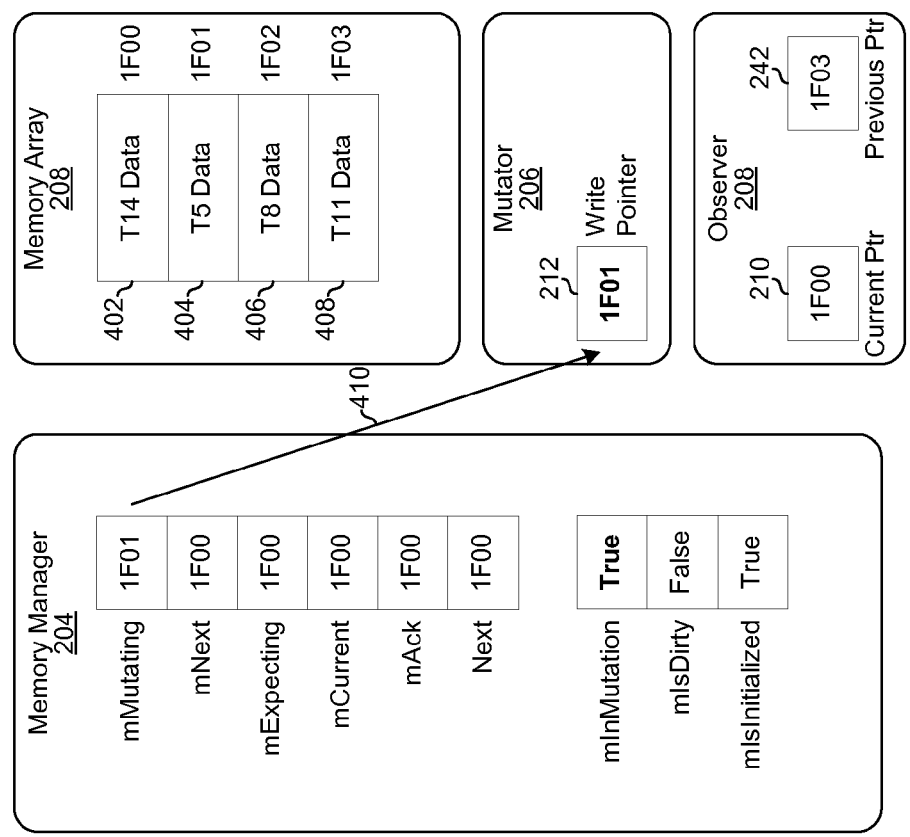
Figure 4K:
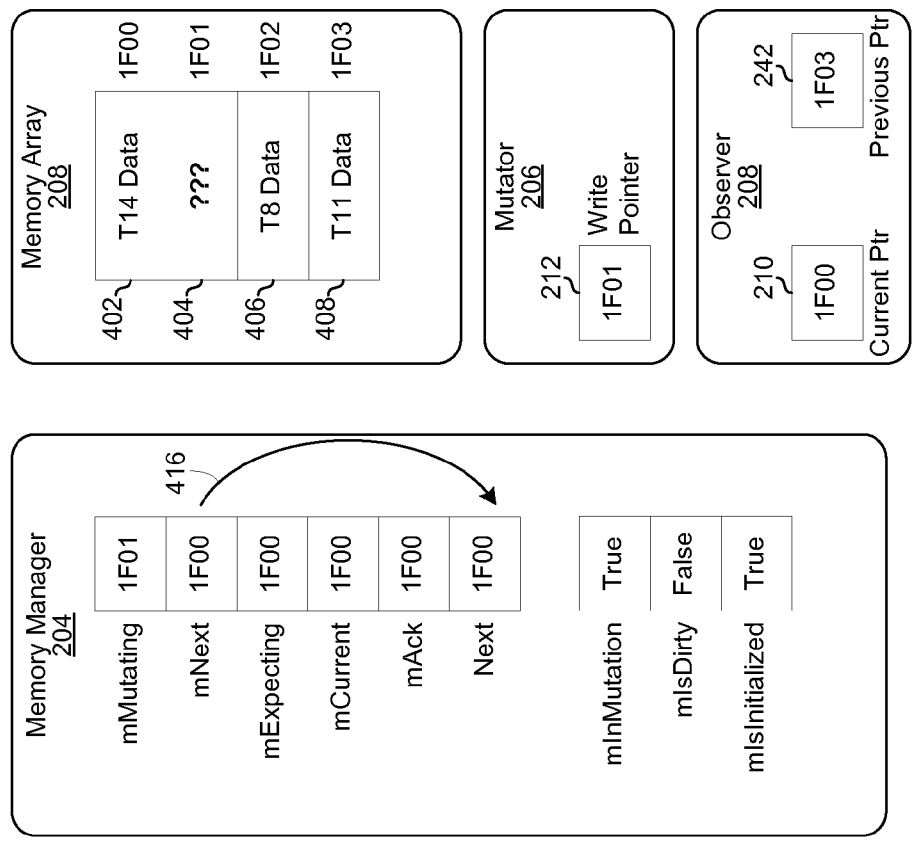
Figure 4M:
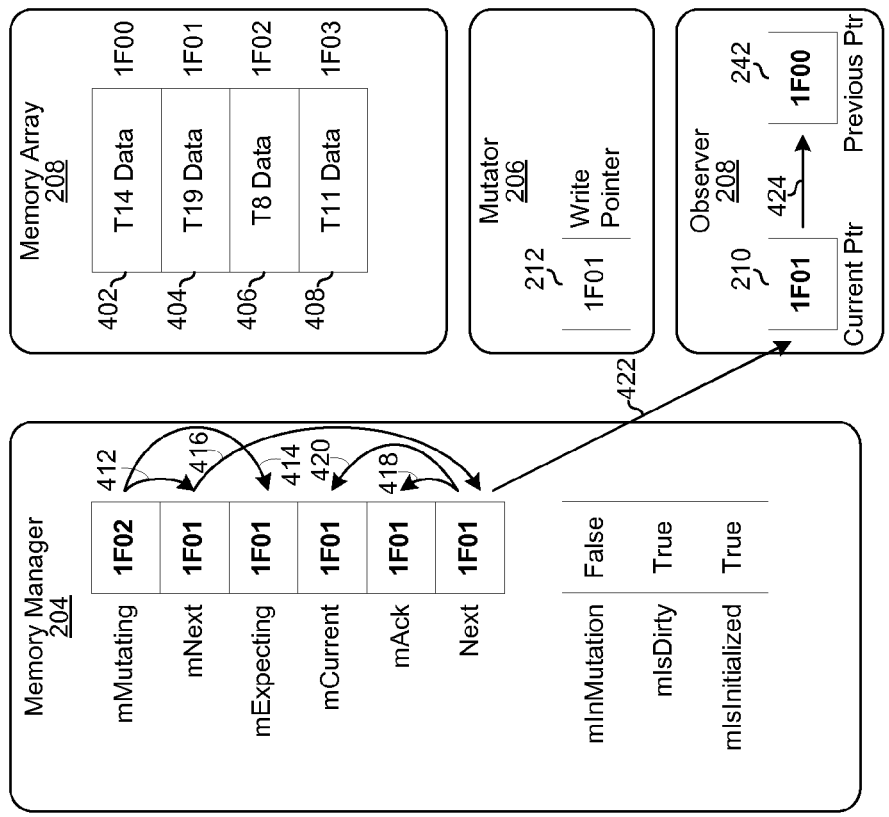
Figure 4N:
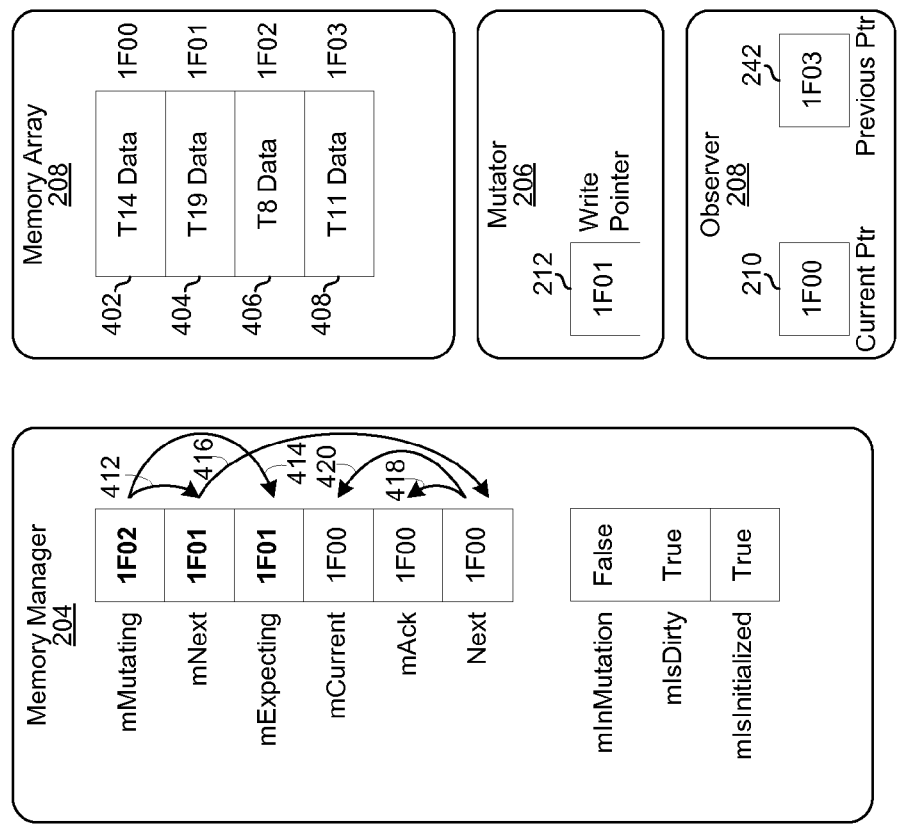

FIGS. 4A-4N depict an example sequence of events in a system operable to share state information in accordance with an implementation of this disclosure. Shown in FIG. 4A is a timeline of a series of events performed by system 200 and corresponding time instants T0-T8 and T21-T25. In FIGS. 4B-4N, the four elements 402, 404, 406, and 408 of the memory array 208 have been arbitrarily been assigned to memory locations 1F00, 1F01, 1F02, and 1F03, respectively.

Referring to FIG. 4A, from time T0 to time T1 the system 200 may startup and mMutating 228 may be initialized. The state of the system 200 at time T1 is shown in FIG. 4B. Question marks indicate unknown contents that have not yet been initialized.

Referring back to FIG. 4A, between time T1 and time T2, the Begin( ) function is executed and the mutator 206 stores state information to the element pointed to by mMutating 228 just prior to time T2. The state of system 200 at time T2 is shown in FIG. 4C. The arrow 410 indicates that the pointer mMutating 228 has been provided by memory manager 204 to mutator 206. Memory manager 204 links the write pointer 212 with pointer mMutating 228.

Referring back to FIG. 4A, between time T2 and time T3, the End(didModify=True) function is executed. The state of system 200 at time T3 is shown in FIG. 4D.

Referring back to FIG. 4A, between time T3 and time T4 the Push( ) function is executed. The state of the system 200 at time T4 is shown in FIG. 4E. The arrow 412 indicates that pointer mNext 220 has been set equal to pointer mMutating 228. As shown in FIG. 4E, mMutating 228 is incremented to a next value at address 1F01. The arrow 414 indicates that pointer mExpecting 240 has been set equal to mMutating 228 value at address 1F00 (mExpecting 240 is different than mAck 216 indicating that an acknowledgment is expected).

Referring back to FIG. 4F, between time T4 and T5 the Begin( ) function is executed and the mutator 206 stores state information to the element pointed to by mMutating 228 just prior to time T5. The state of system 200 at time T5 is shown in FIG. 4F. The arrow 410 indicates that the pointer mMutating 228 has been provided by memory manager 204 to mutator 206. Memory manager 204 links the write pointer 212 with pointer mMutating 228.

Referring back to FIG. 4A, between time T5 and time T6, the End( ) function is executed. The state of system 200 at time T6 is shown in FIG. 4G.

Referring back to FIG. 4A, between time T6 and time T7, the mutator 206 calls Push (BLOCK NEVER) but the function returns false because the previous push performed between time T3 and T4 has not yet been acknowledged. Subsequently, the Poll( ) function is executed. The state of the system 200 at time T7 is shown in FIG. 4H. The arrow 416 indicates that pointer Next 218 has been set equal to pointer mNext 220. The arrow 418 indicates that the pointer mCurrent 214 has been set equal to pointer Next 218. The arrow 420 indicates that the pointer mAck 216 has been set equal to pointer Next 218 (which is equal to mCurrent 214, thus acknowledging the Push( ) performed between time T3 and T4). The arrow 422 indicates that the pointer Next 218 has been provided to the observer 202 (which has set current pointer 210 equal to pointer Next 218). The arrow 424 indicates that the previous pointer 242 has been set equal to current pointer 210.

Referring back to FIG. 4A, between time T7 and T8 the Push( ) function is executed. The state of the system 200 at time T8 is shown in FIG. 4I. The arrow 412 indicates that pointer mNext 220 has been set equal to pointer mMutating 228. As shown in FIG. 4I, mMutating 228 is incremented to a next value at address 1F02. The arrow 414 indicates that pointer mExpecting 240 has been set equal to mMutating 228 value at address 1F01 (mExpecting 240 is different than mack 216 indicating that an acknowledgment is expected).

Referring back to FIG. 4A, between time T8 and time T21 the observer 202 and mutator 206 continue to interact with the memory manager 204 via the respective APIs, such that the state of the system 200 continues to be modified. The details of these interactions are omitted for brevity and the FIG. 4A resumes at arbitrarily selected time T21.

Between time T21 and T22 a begin( ) operation is executed. The state of system 200 at time T22 is shown in FIG. 4J. The arrow 410 indicates that the pointer "mMutating" has been provided to the mutator 206 (where "write pointer" has been set equal to "mMutating").

Referring back to FIG. 4A, between time T22 and T23, the mutator 206 begins modifying the element pointed to by "mMutating" but the observer 202 calls the Poll( ) function before the modification of the state information is completed. Thus, at the time instant that Next 218 is set equal to mNext 220, the contents pointed to by mMutating 228 are invalid. The observer 202, however, is unaffected by this invalid data because it uses the element of memory array 208 pointed to by mNext 220. In this instance, the element of memory array 208 pointed to by mNext 220 is the same as the element pointed to by mCurrent 214, and thus the observer 202 continues to use the element of memory array 208 at address 1F00.

Referring back to FIG. 4A, between time T23 and T24, the state modification begun prior to time T23 completes and the End( ) function is executed. The state of system 200 at time T24 is shown in FIG. 4L.

Referring back to FIG. 4A, between Time T24 and T25 the Push( ) function and Poll( ) function are called and execute concurrently. This results in a race condition. The state of system 200 at time T25 depends on which function wins the race.

FIG. 4M illustrates the situation where the Push( ) function wins the race. That is, the linearizable releasing store operation which sets mNext 220 equal to mMutating 228 occurs before the linearizable acquiring load operation which reads mNext 220. Consequently, the Push( ) performed between time T24 and T25 is acknowledged and current pointer 210 and previous pointer 242 are updated.

FIG. 4N illustrates the situation where the Poll( ) function wins the race. That is, the linearizable acquiring load operation which reads mNext 220 occurs before the linearizable releasing store operation which sets mNext 220 equal to mMutating 228. Consequently, the Push( ) performed between time T24 and T25 is not acknowledged and current pointer 210 and previous pointer 242 remain unchanged.

Figure 5:
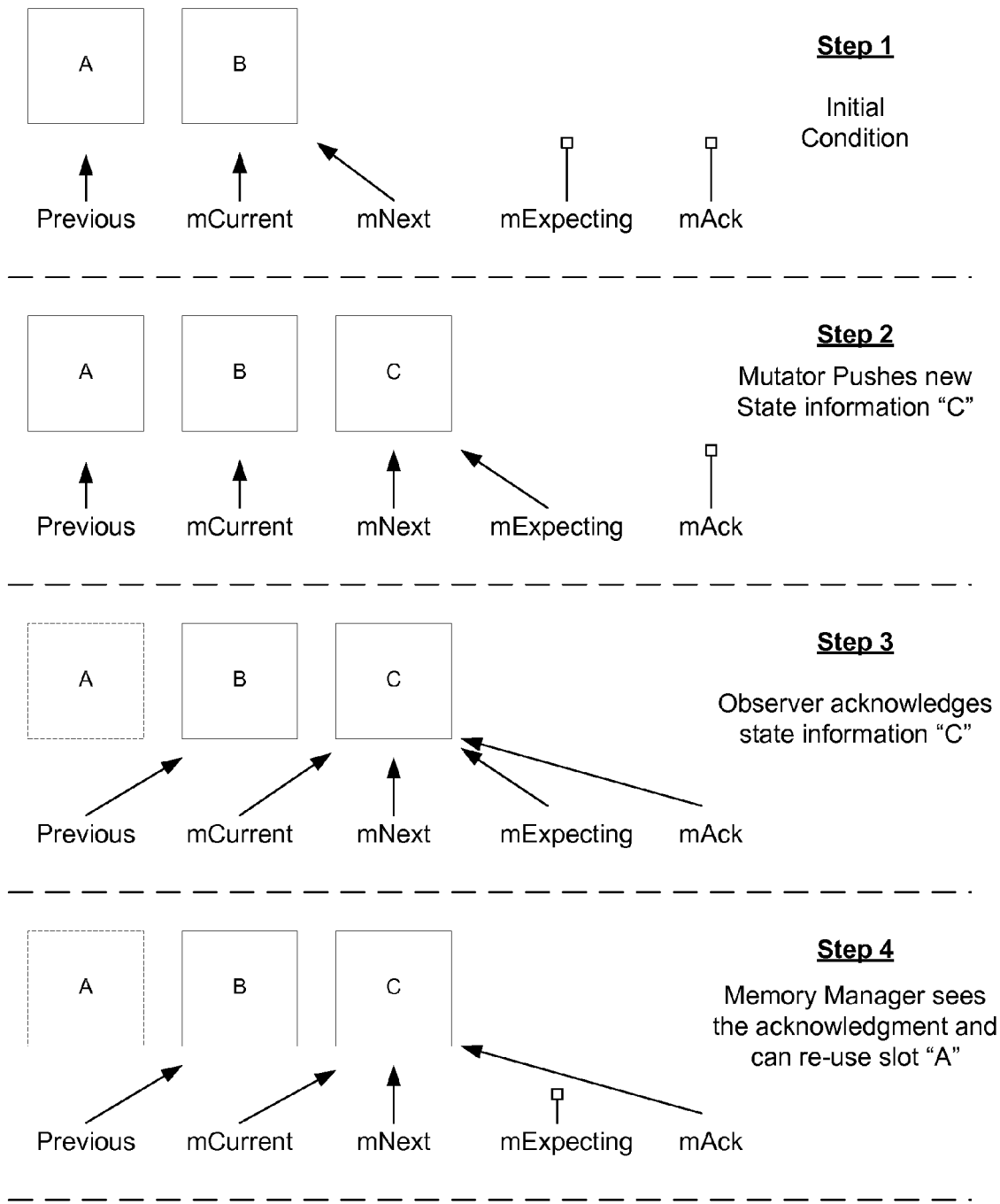
FIG. 5 depicts an example sequence of events in a system operable to share state information in accordance with an implementation of this disclosure.

FIG. 5 depicts an example sequence of events in a system operable to share state information in accordance with an implementation of this disclosure. The sequence of events shown in FIG. 5 are from the perspective of the observer 202 in an example implementation. In an initial condition, the system includes previous state information "A" and current state information "B". The pointer Previous points to the previous state information "A". The pointers mCurrent and mNext point to the current state information "B". The pointers mExpecting and mAck do not point to any elements in the initial condition, since the system is not expecting an acknowledgement of a change to the system since no change has occurred.

Next, the mutator pushes new state information "C" to the system. Initially, the pointer Previous points to the previous state information "A", and the pointer mCurrent points to the state information "B". The pointers mNext and mExpecting point to the state information "C". The pointer mAck does not point to any elements at this time.

Next, at step 3, the observer acknowledges the addition of state information "C" to the system. The observer may acknowledge the addition of state information "C" by observing the pointer mCurrent. The memory manager may set the pointer Next equal to the pointer mCurrent, and the pointer Next equal to the pointer mAck. The pointer Previous points to the state information "B", while the pointers mCurrent, mNext, mExpecting, and mAck point to the state information "C". Finally, at step 4, the memory manager recognizes the acknowledgement since the memory manager causes mExpecting to point to no elements. As such, the memory manager can re-use slot "A". At this stage, the pointer Previous points to state information "B", while the pointers mCurrent, mNext and mAck point to the state information "C". The pointer mExpecting does not point to any elements at this time, since the memory manager already recognizes the acknowledgement.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for shared state information among concurrently running processes or threads.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

APPENDIX A – "STATEQUEUE.H"

```cpp
#ifndef ANDROID_AUDIO_STATE_QUEUE_H
define ANDROID_AUDIO_STATE_QUEUE_H namespace android { template<typename T> class StateQueue { public:
        StateQueue();
    virtual ~StateQueue();

const T* poll();

T*     begin();

void   end(bool didModify = true);

enum block_t {
      BLOCK_NEVER,
      BLOCK_UNTIL_PUSHED,
      BLOCK_UNTIL_ACKED,
    };
    bool   push(block_t block = BLOCK_NEVER);

bool   isDirty() const { return mIsDirty; } private:
    static const unsigned kN = 4;
    T              mStates[kN];

volatile const T* mNext;
    volatile const T* mAck;

const T*       mCurrent;

// only used by mutator
    T*             mMutating;
    const T*       mExpecting;
    bool           mInMutation;
    bool           mIsDirty;
    bool           mIsInitialized;
```

```
};  // class StateQueue

}   // namespace android
```

APPENDIX B – "STATEQUEUE.CPP"

```cpp
#define LOG_TAG "StateQueue"

#include <time.h>
#include <cutils/linearizable.h>
#include <utils/Log.h>
#include "StateQueue.h"

namespace android { template<typename T> StateQueue<T>::StateQueue() :
    mNext(NULL), mAck(NULL), mCurrent(NULL),
    mMutating(&mStates[0]), mExpecting(NULL),
    mInMutation(false), mIsDirty(false), mIsInitialized(false)
{
} template<typename T> StateQueue<T>::~StateQueue()
{
} template<typename T> const T* StateQueue<T>::poll()
{
    const T *next = (const T *) android_linearizable_acquire_load((volatile int32_t *) &mNext);
    if (next != mCurrent) {
        mAck = next;
        mCurrent = next;
    }
    return next;
} template<typename T> T* StateQueue<T>::begin()
{
    mInMutation = true;
    return mMutating;
} template<typename T> void StateQueue<T>::end(bool didModify)
{
    if (didModify) {
        mIsDirty = true;
        mIsInitialized = true;
    }
    mInMutation = false;
```

```
} template<typename T> bool StateQueue<T>::push(StateQueue<T>::block_t block)
{
#define PUSH_BLOCK_ACK_NS    3000000L
    static const struct timespec req = {0, PUSH_BLOCK_ACK_NS};
    if (mIsDirty) {
        if (mExpecting != NULL) {
            for (;;) {
                const T *ack = (const T *) mAck;
                if (ack == mExpecting) {
                    break;
                }
                if (block == BLOCK_NEVER) {
                    return false;
                }
                nanosleep(&req, NULL);
            }
        } android_linearizable_release_store((int32_t) mMutating, (volatile int32_t *) &mNext);
        mExpecting = mMutating;

if (++mMutating >= &mStates[kN]) {
            mMutating = &mStates[0];
        }
        *mMutating = *mExpecting;
        mIsDirty = false;
    } if (block == BLOCK_UNTIL_ACKED) {
        if (mExpecting != NULL) {
            for (;;) {
                const T *ack = (const T *) mAck;
                if (ack == mExpecting) {
                    mExpecting = NULL;
                    break;
                }
                nanosleep(&req, NULL);
            }
        }
    }
    return true;
}

}
```

What is claimed is:

1. A system comprising one or more processors, a mutator, an observer, an N-element memory array, a first pointer used by the mutator for writing to the N-element memory array, a second pointer used by the observer for reading from the N-element memory array, and a third pointer, wherein:
   in response to a first function being called by the mutator, the system is configured to provide the first pointer to the mutator;
   in response to a second function being called by the mutator, the system is configured to set the third pointer equal to the first pointer and then circularly advance the first pointer; and
   in response to a third function being called by the observer, the system is configured to set the second pointer equal to the third pointer, and then provide the second pointer to the observer.

2. The system of claim 1, wherein:
   in response to the third function being called by the observer, the system is configured to read the third pointer and then set the second pointer equal to the read value of the third pointer.

3. The system of claim 1, further comprising:
   a first processor and a second processor, wherein the mutator is configured to run on the first processor and is configured to change one or more values of one or more attributes, and wherein the observer is configured to run on the second processor and is configured to retrieve the one or more values of the one or more attributes.

4. The system of claim 1, wherein:
   in response to the first function being called by the mutator, the system is configured to assert a flag to indicate that a modification of the N-element memory array is in progress.

5. The system of claim 1, wherein:
   in response to the second function being called by the mutator, the system is configured to determine whether a previous performance of the second function has been acknowledged;
   if the previous performance of the second function has been acknowledged, then the system is configured to perform the second function; and
   if the previous performance of the second function has not been acknowledged, then the system is configured to abort the second function or wait for the previous performance of the second function to be acknowledged.

6. The system of claim 5, wherein:
   the determination of whether the previous performance of the second function has been acknowledged comprises a comparison of a fourth pointer to a fifth pointer, wherein the fourth pointer points to an element of the N-element memory array representing an acknowledgement of the second function, and wherein the fifth pointer points to an element of the N-element memory array representing an expectation of the acknowledgement.

7. The system of claim 1, wherein:
   in response to the third function being called by the observer, the system is configured to determine whether the second function has been successfully executed since a most-recent execution of the third function; and
   based on the second function being successfully executed since a most-recent execution of the third function, the system is configured to acknowledge the successful execution of the second function.

8. The system of claim 7, wherein:
   to determine whether the second function has been successfully executed since a most-recent execution of the third function, the system is configured to set a fourth pointer equal to the third pointer, wherein the fourth pointer points to an element of the N-element memory array representing a current state of the system.

9. A method performed by a system comprising a mutator, an observer, an N-element memory array, a first pointer used by the mutator for writing to the N-element memory array, a second pointer used by the observer for reading from the N-element memory array, and a third pointer, the method comprising:
   in response to a first function being called by the mutator, providing the first pointer to the mutator;
   in response to a second function being called by the mutator, setting the third pointer equal to the first pointer and then circularly advancing the first pointer; and
   in response to a third function being called by the observer, setting the second pointer equal to the third pointer, and then providing the second pointer to the observer.

10. The method of claim 9, further comprising:
    in response to the third function being called by the observer, reading the third pointer and then setting the second pointer equal to the read value of the third pointer.

11. The method of claim 9, wherein:
    the system further comprises a first processor and a second processor; and
    the mutator runs on the first processor and the observer runs on the second processor.

12. The method of claim 9, further comprising:
    in response to the first function being called by the mutator, asserting a flag to indicate that a modification of the N-element memory array is in progress.

13. The method of claim 9, further comprising:
    in response to the second function being called by the mutator, determining whether a previous performance of the second function has been acknowledged;
    if the previous performance of the second function has been acknowledged, performing the second function; and
    if the previous performance of the second function has not been acknowledged, aborting the second function or waiting for the previous performance of the second function to be acknowledged.

14. The method of claim 13, wherein:
    the determination of whether the previous performance of the second function has been acknowledged comprises comparing a fourth pointer to a fifth pointer, wherein the fourth pointer points to an element of the N-element memory array representing an acknowledgement of the second function, and wherein the fifth pointer points to an element of the N-element memory array representing an expectation of the acknowledgement.

15. The method of claim 9, further comprising:
    in response to the third function being called by the observer, determining whether the second function has been successfully executed since a most-recent execution of the third function; and
    based on the second function being successfully executed since a most-recent execution of the third function, acknowledging the successful execution of the second function.

16. The method of claim 15, wherein:
    the acknowledgment of the successful execution of the second function comprises setting a fourth pointer equal to the third pointer, wherein the fourth pointer points to an element of the N-element memory array representing a current state of the system.

17. A computer readable storage device encoded with a computer program, the program comprising instructions that, if executed by one or more computers, cause the one or more computers to perform operations comprising:
- in response to a first function being called by a mutator, providing a first pointer to the mutator;
- in response to a second function being called by the mutator, setting a third pointer equal to the first pointer and then circularly advancing the first pointer; and
- in response to a third function being called by an observer, setting a second pointer equal to the third pointer, and then providing the second pointer to the observer.

18. The computer readable storage device of claim 17, wherein the functions further comprise:
- in response to the third function being called by the observer, reading the third pointer and then setting the second pointer equal to the read value of the third pointer.

* * * * *